May 31, 1938.   S. MARCUS   2,119,214
ROLLING EYE SET
Filed Dec. 2, 1933   2 Sheets-Sheet 1
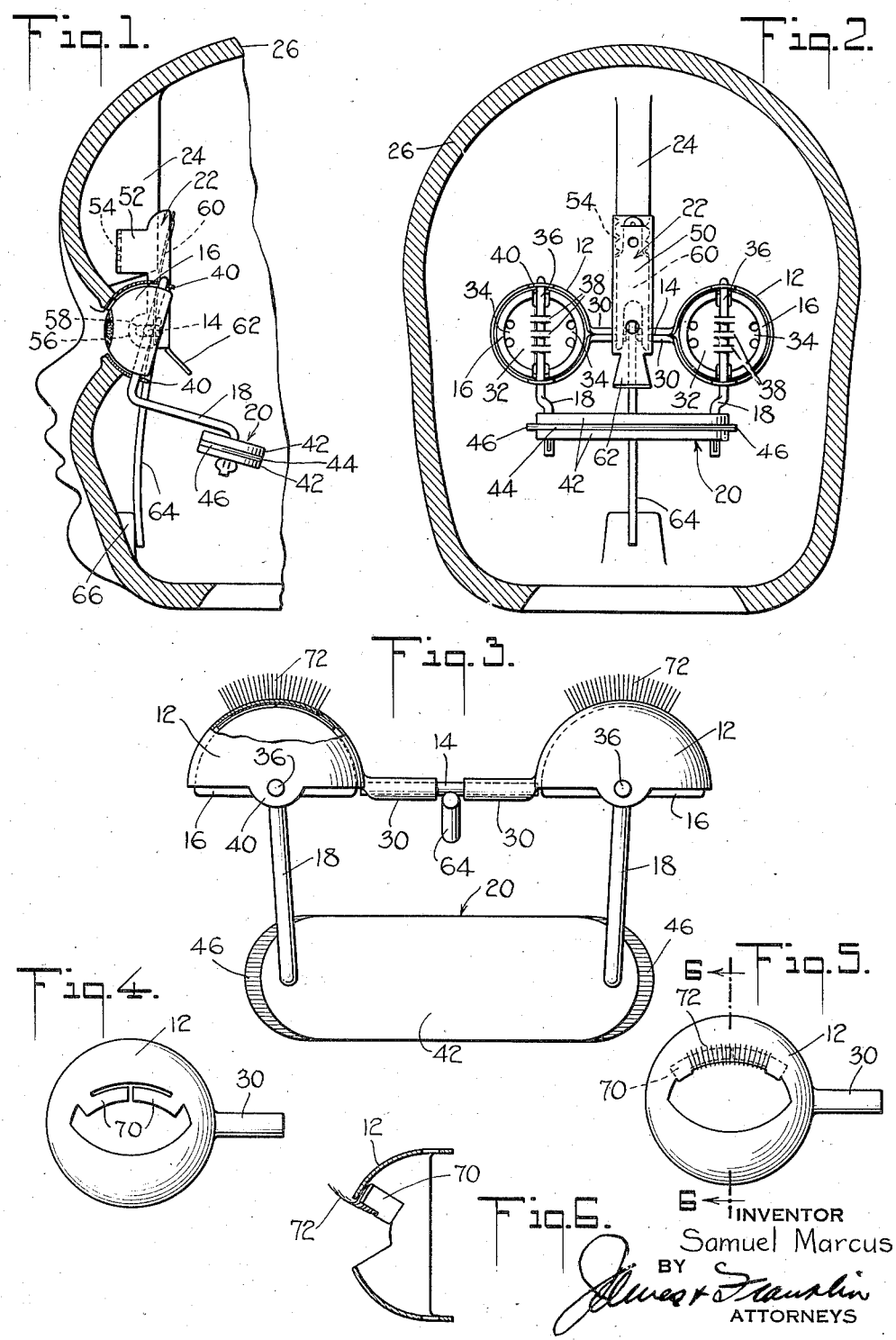
INVENTOR
Samuel Marcus
BY
ATTORNEYS May 31, 1938.  S. MARCUS  2,119,214
ROLLING EYE SET
Filed Dec. 2, 1933  2 Sheets-Sheet 2
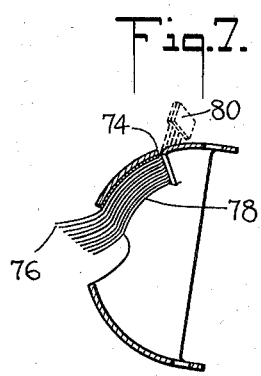
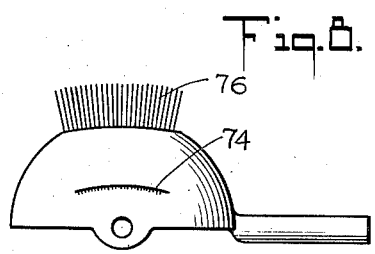
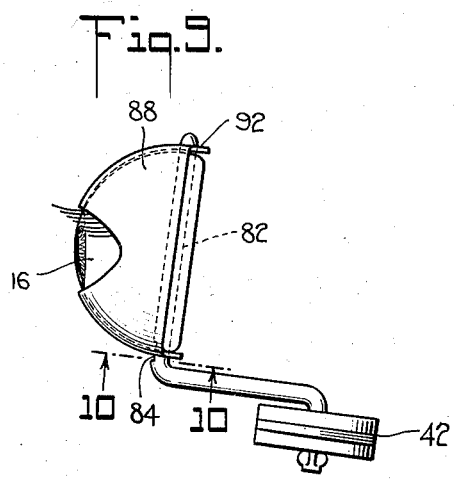
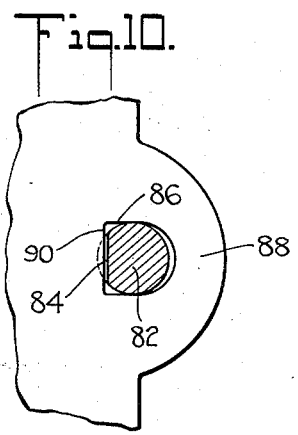
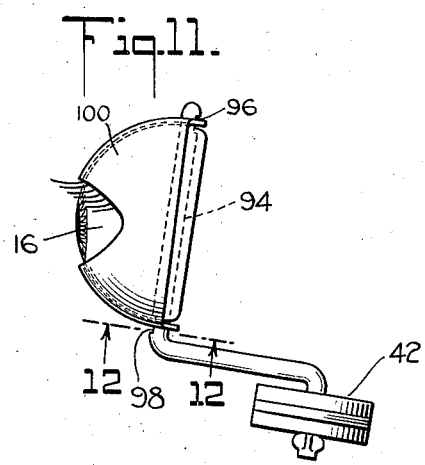
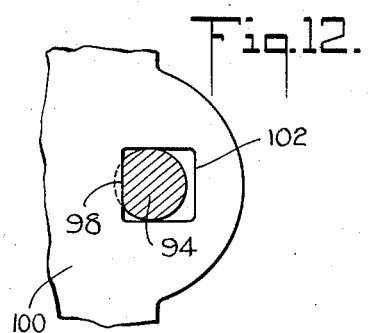
INVENTOR
Samuel Marcus
BY
ATTORNEYS Patented May 31, 1938

2,119,214

UNITED STATES PATENT OFFICE 2,119,214

ROLLING EYE SET

Samuel Marcus, New York, N. Y., assignor, by mesne assignments, to Margon Corporation, Bayonne, N. J., a corporation of New Jersey Application December 2, 1933, Serial No. 700,641

21 Claims. (Cl. 46—168)

This invention relates to dolls and more particularly to movable eyes, especially rolling eyes therefor.

The primary object of my invention is to generally improve rolling eye sets. More particular objects of my invention are to provide in combination with eye members movable from side to side, outer shells forming a protective housing for the eye members and eliminating frictional resistance to the sideward or rolling movement of the eye members; to form simulated eye lids as a part of the aforesaid outer shells; to provide the same, if desired, with eye lashes; to arrange the eye lids with or without the eye lashes for vertical or opening and closing movement unaccompanied by the side to side or rolling movement of the eye members per se; to cause simultaneous and equal closing or opening movement of the eye lids; and to cause simultaneous and equal side to side movement of the eye members without any interference with the desirable free and frictionless movement of the same.

Further objects of my invention center about the provision of a fully adjustable eye set and are to afford relative adjustment of the outer shells or eye lid members and/or the eye members about the horizontal axis; and to afford relative adjustment of the eye members about vertical axes. Still further objects of my invention center about the means to move and to limit the movement of the eye set, and include the provision of appropriate means to limit the opening and closing movement of the eye set; the provision of a single operating weight for causing both vertical oscillation of the eye set and horizontal oscillation of the eye members; and the provision of appropriate bumper means formed as a part of the weight assembly for limiting the side to side movement of the eye members and for silencing the operation of the eye set. Still another object of my invention is to so design the eye set that it may be mounted in and supported by any preferred eye set support or bridge of standard type such as are commonly employed for eyes of the non-rolling type.

While it is important, as aforesaid, to mount the eye members for side to side movement in a relatively frictionless manner so that the operating weight will be freely capable of moving the eyes to either extreme side position, thus giving the face of the doll a vivacious and flirtatious appearance, it is, on the other hand, desirable to prevent quivering or wavering of the eyes when looking in a forward direction. In other words, if the mounting is made too sensitive and unstable, it is difficult to prevent movement of the eye members even when not desired. It is accordingly a further object of my invention to overcome this difficulty and to provide an eye set which, on the one hand, will be arranged for substantially frictionless movement from side to side, but which, on the other hand, will tend to moderately resist movement when the eye members are looking in a desired direction, as, for example, straight ahead. Differently expressed, I provide the eye set with special means automatically operative to steady the gaze in a desired direction.

To the accomplishment of the foregoing and such other objects as will hereinafter appear, my invention consists in the eye set elements and their relation one to another as hereinafter are more particularly described in the specification and sought to be defined in the claims. The specification is accompanied by drawings in which:

Fig. 1 is a section taken in elevation through one eye opening of a doll head provided with a rolling eye set embodying features of my invention;

Fig. 2 is a section taken in elevation in back of the eye set looking forward at the same;

Fig. 3 is a plan view of the eye set;

Fig. 4 is a front elevation of an outer shell prior to attachment of an eye lash;

Fig. 5 is a similar view with the eye lash in place;

Fig. 6 is a section taken in the plane of the line 6—6 of Fig. 5;

Fig. 7 is a similar section showing a modified form of eye lash mounting;

Fig. 8 is a plan view of the same;

Fig. 9 is a side elevation of an eye set provided with means to eliminate clearance and introduce friction when the eyes are looking in a desired direction;

Fig. 10 is an enlarged fragmentary section in the plane of the line 10—10 of Fig. 9;

Fig. 11 is a side elevation of an eye set provided with a different type of mechanism for the same purpose; and Fig. 12 is an enlarged section of a detail looking in the plane of the line 12—12 in Fig. 11.

Referring to the drawings, the eye set comprises a pair of outer shells 12 interconnected by a stub shaft 14, a pair of eye members 16 mounted for side to side movement within outer shells 12, a pair of arms 18 extending rearwardly from eye members 16, and an operating weight 20 interconnecting arms 18 and causing opening and closing movement of the eye set and side to side movement of the eye members. The eye set is mounted in and supported by a support 22 which, in the present case, is clamped on a web 24 molded integrally with the doll head 26.

Considering the mechanism in greater detail, the outer shells 12 are preferably each pressed from a single piece of sheet metal and are formed integrally with projecting collars 30. If desired, these collars may, of course, be made separately and welded to the outer shells. The collars 30 are dimensioned to fit tightly on stub shaft 14 which, as is best shown in Fig. 3, is simply a short length of rod or stiff wire. The fit of collars 30 on rod 14 is such that the outer shells 12 are interconnected and caused to move simultaneously and equally but at the same time it is possible to adjust one of the outer shells relative to the other on stub shaft 14, thus making available a fixed adjustment of the eye lids and eye members about a horizontal axis. As is understood by those skilled in this art, such an adjustment is highly desirable in order to compensate for any departure from symmetry in the location of the eye openings in the doll head.

The eye members 16 may be of a well-known and popular type, in which a generally hemispherical eye shell is provided with a back plate 32 largely severed from the eye member but connected thereto at spaced points, preferably the points 34, at the ends of the diameter transverse to the direction of rods 36 on which the eye members are mounted. This affords manual adjustment of the eye shell relative to the back plate and consequently of the eye shell relative to the outer shell. This makes it possible to adjust the eyes to gaze in a common horizontal plane even though they may have been displaced from a common plane when adjusting the outer shells or eyelids relative to one another in order to bring the eyelids into registry with the eye openings in the doll head. Back plates 32 are incised to form parallel straps 38 which are alternately displaced in opposite directions to receive rod 36. The fit of rod 36 in back plate 32 is such that the plate is caused to oscillate with the rod. Yet, under considerable stress, the plate and with it, the eye member, may be moved about the rod, thus affording independent relative adjustment of the eye members about vertical axes. This adjustment is exceedingly desirable in order to permit focusing of the eyes so as to avoid a cross-eyed or wall-eyed appearance.

It may be remarked that the eye member and back plate construction is of a conventional and popular type in which the rod extends horizontally and acts as a direct tie bar between the eye members, the eye members being intended for opening and closing but not for rolling movement. In the present construction, the direction of the axis is moved from a horizontal to a vertical position.

Rods 36 are mounted in holes punched through the top and bottom of outer shells 12, these shells being provided with rearwardly extending ears 40 in order that the axis of rod 36 may pass through the center of the spherical surface of the outer shell. The rearwardly and downwardly extending arms 18 of the eye members are preferably formed as direct extensions or continuations of rods 36, this being evident from the drawings.

The eye set is preferably operated by a single weight member 20 which acts also as a tie bar interconnecting the eye members for uniform side to side movement. The weight member is preferably made of laminations and in the present case, consists of upper and lower laminations 42 of relatively heavy metal strip having sandwiched therebetween a lamination 44 of relatively soft material, the lamination 44 projecting beyond the ends of strips 42 in order to provide end bumpers 46. The strip 44 may, for example, be made of cardboard and as the weight assembly 20 moves from side to side, this motion is limited and noisy operation and bumping prevented by reason of the bumpers 36 striking the side walls of the doll head, instead of the metal weight.

The eye set is mounted on a support 22, this support consisting of a relatively heavy piece of sheet metal bent in channel form and including a back strip 50 and forwardly extending main side arms 52, the ends of which are provided with tangs 54 embedded in the web 24 of the doll head. The support 22 further includes a pair of forwardly extending arms 56 at its lower end, these arms being slotted at 58 to receive the horizontal axis of the eye set. The eye set is normally urged forwardly by a leaf spring 60, the upper end of which is anchored on wall 50, and the lower end of which is bifurcated and bears against the eye set. The rear wall 50 is projected downwardly and rearwardly to form a somewhat resilient stop member 62 which cooperates with a stop wire 64 welded to the center of stub shaft 14 of the eye set. As will be evident from an inspection of Fig. 1, stop wire 64 bears against a portion 66 of the head to define the opened position of the eye set. The same stop wire 64 when swung rearwardly bears against the depending stop projection 62 to define and limit the closed position of the eye set.

It will be understood that while I have shown the eye set mounted on a support 22 especially adapted for a head having a central web 24, the present eye set is characterized by the important advantage that it may be mounted on any standard form of support, such as, for example, a common and popular transverse expansible bridge forming the subject of United States Letters Patent 1,621,072, issued to Alexander Konoff on March 15, 1927.

The outer shell 12 of the eye set is, of course, cut away to expose the eye member 16. The cutting away of the outer shell leaves a simulated eye lid portion movable across the eye opening to close the same. This eye lid portion may, if desired, be provided with eye lashes. Such eye lashes may, if desired, be simply mounted on the inner surface of the eye. Another mode of mounting is illustrated in Figs. 4, 5 and 6, in which it will be observed that parts of the cut away sheet metal are shaped to form eye lash holding straps 70 which may be bent from the initial position shown in Fig. 4 rearwardly and upwardly to the position shown in Figs. 5 and 6, the eye lash strands 72 being clamped in place between the inner surface of the eye lid and the straps 70.

Still another method of securing the eye lashes to the eye lid is shown in Figs. 7 and 8 of the drawings. In this case, the eye lid is simply slit as shown at 74 and the eye lash 76 is inserted through the resulting slit and cemented to the inner wall of the eye lid as at 78. The lash 76 is initially prolonged and provided with a foundation 80 which facilitates the insertion of the lash through slit 74. Aftr the lash has been clamped and cemented in place, the foundation 80 and excess length of lash may be trimmed off close to slit 74 as shown in the drawings.

While one important advantage of my invention as so far described resides in the provision of a definite clearance between the outer shell and the eye member, resulting in substantially frictionless side to side movement of the eye members, this advantage results in a sensitivity of response which some may deem a disadvantage, for it is difficult to hold the eyes in a steady position unless the doll is supported rigidly against movement. Figs. 9 and 10 show a modification of the invention providing means automatically operative when the eyes gaze in a desired direction, and operative solely at that time for eliminating the clearance between the eye member and the outer shell and thus introducing frictional resistance to movement. Referring to Figs. 9 and 10, the upright shaft 82 is flattened on its forward side at 84, and the lower bearing hole 86 in the outer shell 88 is matingly flattened at 90, the forward side 90 of aperture 86 being sufficiently removed from the rear wall of the bearing hole as to permit the eye member 16 to move into frictional contact with the outer shell 88 and particularly the lower portion thereof. It will be evident from inspection of Fig. 9 that the operating weight 42 exerts a downward force which manifests itself as a clockwise turning moment about the upper bearing 92, thereby moving the flattened portion 84 of the shaft toward the mating flattened portion 90 of the lower bearing. If the doll is moved only slightly, the effect of operating weight 42 is insufficient to overcome the frictional resistance between the eye member and the outer shell. If, however, the doll is moved an appreciable or substantial amount, the initial frictional resistance is overcome and the weight turns the eyes toward one side or the other. The initial movement of the eye members brings the arcuate surface of shaft 82 into contact with the lower bearing, thus moving the eye member rearwardly away from the outer shell and again introducing the desired normal clearance and again restoring the desired substantially frictionless operation of the eye set.

Still another means for accomplishing this result is illustrated in Figs. 11 and 12. Referring to these figures, the upright shaft 94 is slightly flattened on its rear side at the upper end 96, and is slightly flattened on its forward side at the lower end 98. The bearing apertures in outer shell 100 are matingly flattened or, more simply, may be made square as is indicated at 102 in Fig. 12. In any case, it will be understood that the dimensioning is such that the shaft may rotate in the bearing. Here again it will be evident from inspection of Fig. 11 that the operating weight 42 exerts a downward force which manifests itself as a clockwise turning moment tending to bring the flattened portions 96 and 98 of shaft 94 into engagement with the mating flattened sides of the bearings. This movement is not intended to bring the eye member 16 into frictional contact with the outer shell 100, and does not do so. Instead, the resistance to turning movement is provided by the engagement of the flats on the shaft and bearings. The gaze of the eye member is then steadied in the desired direction, but, of course, upon appreciable or substantial movement of the doll, the weight 42 turns the eye member, and, when once started, the eye member moves in the desired frictionless manner.

It will be understood that in the form of the invention shown in Fig. 11, it is possible to use the upper flattened portion 96 alone, or the lower flattened portion 98 alone, instead of using the two together in the manner shown. It will further be understood that in both forms of the invention illustrated in Figs. 9 and 11, the gaze of the eye member may be arrested in any desired position instead of the forward looking position shown, by simply appropriately modifying the location of the flattened parts on the shaft.

It is believed that the mode of constructing and using as well as the many advantages of my improved rolling eye set will be apparent from the foregoing detailed description thereof. The eyes move in unison whether for opening or closing or for side to side movement. The relative position of the eyes may be adjusted in various directions to fit any particular head. A single operating weight not only provides the sleeping and rolling movements of the eye members but also acts as a tie bar between the eye members and acts as a bumper or motion limiting stop. The eye set may be mounted in any standard form of bridge as well as on the special bridge or support illustrated. The eye set provides an eye lid separate from the eye member which, in turn, may carry an eye lash and eye lid and simulate a natural eye lid in moving up and down but not from side to side with the eye member. One very important advantage of this eye set is the protective housing of the eye member by the outer shell providing a clearance around the eye member which permits side to side movement in a perfectly frictionless manner without any direct contact with the eye opening. This makes the side to side movement of the eyes sensitive to even a little movement or change in position of the doll and causes the eye set to function in an extremely life-like and realistic manner. Full sensitivity of movement may be retained, thus assuring oscillation of the eye members fully to one side or the other, when such oscillation is desired, and yet the eyes are automatically steadied in one position so that they will gaze in a desired direction without undue wavering.

It will be apparent that while I have shown and described my invention in the preferred forms, many changes and modifications may be made in the forms and structures described without departing from the spirit of the invention, defined in the following claims.

I claim:

1. A rolling eye set comprising a pair of vertically oscillatable outer shells, a horizontal stub shaft interconnecting the same at the axis of oscillation, said outer shells being frictionally fixed adjustably on the stub shaft, a pair of eye members within the outer shells, upright shafts pivoted in the outer shells and carrying the eye members, said eye members being frictionally fixed adjustably on said shafts, said upright shafts being greatly prolonged at their lower ends and the resulting extensions being bent rearwardly below the outer shells, gravity operated means interconnecting the same for causing both vertical oscillation of the eye set and horizontal oscillation of the eye members, said outer shells being cut away at the lower front face thereof to expose the eye members, and the upper portion of the outer shells serving as eye lids.

2. A rolling eye set comprising a pair of outer shells, a horizontal stub shaft interconnecting the same, a pair of eye members within the outer shells, upright shafts pivoted in the outer shells and carrying the eye members, said upright shafts being greatly prolonged at their lower ends and the resulting extensions being bent rearwardly below the outer shells, gravity operated means interconnecting the same for causing both vertical oscillation of the eye set and horizontal oscillation of the eye members, said outer shells being cut away at the lower front face thereof to expose the eye members, the upper portion of the outer shells serving as eye lids, eye lashes secured to said eye lids, and a motion limiting stop member secured to said stub shaft, and an eyeset supporting bridge comprising means for attaching the same to a doll head, and further comprising means to oscillatably receive the horizontal stub shaft of the eye set between the outer shells.

3. A rolling eye set comprising a pair of arms extending rearwardly therefrom, and a single weight bar interconnecting the arms for causing side to side oscillation of the eye members, said weight bar being made up of a plurality of laminations of material at least one of which is relatively heavy metal and at least one of which is a relatively soft material and is longer than the metallic lamination in order to provide bumpers at the ends of the assembled weight bar.

4. A rolling eye set comprising a pair of outer shells, a horizontal shaft interconnecting the same, a pair of eye members within the outer shells, upright shafts pivoted in the outer shells and carrying the eye members, said upright shafts being bent rearwardly and downwardly below the outer shells, gravity operated weight means interconnecting the same for causing both vertical oscillation of the eye set and horizontal oscillation of the eye members, said outer shells being cut away at the lower front portions thereof to expose the eye members, the upper front portions of said outer shells acting as eye lids, the aforesaid upright shafts and the bearing apertures in the outer shells being flattened at the rear side of the upper end of the shaft, and at the front side of the lower end of the shaft, whereby, under the influence of the weight means, the mating flattened portions tend to prevent side to side movement of the eye members when the eyes are looking in a forward direction.

5. A support for an eye set, said support comprising a piece of sheet metal bent to form a vertically disposed channel, the sides of said channel near the upper part of the support being projected forwardly to form a pair of main arms, tangs bent inwardly toward one another on said main arms adapted to be embedded in a central vertical web in the doll's head, the sides of said support near the bottom thereof being projected forwardly to form a pair of supporting arms, said arms being slotted to receive the eye set, a spring secured near the uper part of the support and extending to the lower part of the support for urging the eye set forwardly in the slots, and a downwardly and rearwardly extending tab formed integrally with the support and acting as a motion limiting stop for the eye set.

6. An eye set comprising a pair of outer shells, a pair of eye members pivoted within the outer shells for movement about upright axes, gravity operated weight means for moving the eye members, said eye members and outer shells having clearance therebetween in order to eliminate frictional resistance to side to side movement of the eye members, and means operative solely when the eye members look in a forward direction for moving the eye members into engagement with the outer shells and thereby eliminating the clearance therebetween.

7. A rolling eye set comprising a pair of outer shells, means interconnecting the same for simultaneous movement about a horizontal axis, a pair of eye members within the outer shells, upright shafts pivoted in the outer shells and carrying the eye members, arms extending rearwardly from the eye members, gravity operated weight means interconnecting the arms, said eye members and outer shells having clearance therebetween to eliminate frictional resistance to movement of the eye members, the upright shafts and the bearing holes therefor in the outer shells being so relatively shaped as to permit the eye members to move forward into frictional engagement with the outer shells when the eye members are looking in a desired direction.

8. An eye set comprising a pair of eye members, bearing means and generally upright shafts mounting the eye members for relatively frictionless side to side movement, gravity operated weight means for moving the eye members, said shafts and bearings being so relatively noncircularly shaped as to tend under the influence of the weight to prevent side to side movement of the eye members solely when the eye members are looking in a desired direction.

9. A rolling eye set comprising a pair of outer shells, means interconnecting the same for simultaneous movement about a horizontal axis, a pair of eye members pivoted within the outer shells, upright shafts pivoted in the outer shells and carrying the eye members, said upright shafts being bent rearwardly, gravity operated weight means interconnecting the same, said upright shafts and mating bearings in the outer shell being so flattened on one side as to tend under the influence of the weight to prevent side to side movement of the eye members when the eye members are looking in a forward direction.

10. A rolling eye set comprising a pair of vertically oscillatable outer shells, a horizontal stub shaft extending therebetween at the axis of oscillation of the outer shells, a pair of eye members within said outer shells, said eye members having back plates secured thereto at points at the opposite extremities of a horizontal diameter, thereby affording vertical adjustment of the eye members relative to the back plates, upright shafts pivoted in and carried by the outer shells and frictionally secured to said back plates, thereby affording sideward adjustment of the eye members, said upright shafts securing the outer shells and eye members together for simultaneous vertical oscillation about the axis of the horizontal stub shaft, and gravity operated means for causing both vertical oscillation of the eye set and horizontal oscillation of the eye members.

11. A rolling eye set comprising a pair of vertically oscillatable outer shells, collars projecting sidewardly at the adjacent sides of the outer shells, a horizontal stub shaft extending between said collars at the axis of oscillation of the outer shells, the parts being frictionally related to normally cause simultaneous oscillation of the outer shells while affording relative adjustment, a pair of eye members within said outer shells and pivoted thereon for sideward oscillation, and gravity operated means for causing both vertical oscillation of the eye set and horizontal oscillation of the eye members, the outer shells and eye members moving together during vertical oscillation of the outer shells.

12. A rolling eye set comprising a pair of vertically oscillatable outer shells, a horizontal stub shaft extending therebetween at the axis of oscillation of the outer shells, the parts being frictionally related to normally cause simultaneous oscillation of the outer shells while affording relative adjustment, a pair of eye members within said outer shells, said eye members having back plates secured thereto at points at the opposite extremities of a horizontal diameter, thereby affording vertical adjustment of the eye members relative to the back plates and outer shells, upright shafts pivoted in and carried by the outer shells and secured to said back plates, said upright shafts securing the outer shells and eye members together for simultaneous vertical oscillation about the axis of the horizontal stub shaft, and gravity operated means for causing both vertical oscillation of the eye set and horizontal oscillation of the eye members.

13. A rolling eye set comprising a pair of vertically oscillatable outer shells, a horizontal stub shaft extending therebetween at the axis of oscillation of the outer shells, the parts being frictionally related to normally cause simultaneous oscillation of the outer shells while affording relative adjustment, a pair of eye members within said outer shells, upright shafts pivoted in and carried by the outer shells and frictionally secured to said eye members, thereby affording sideward adjustment of the eye members, said upright shafts securing the outer shells and eye members together for simultaneous vertical oscillation about the axis of the horizontal stub shaft, said upright shafts being bent rearwardly below the outer shells, gravity operated means interconnecting the same for causing both vertical oscillation of the eye set and horizontal oscillation of the eye members, said outer shells being cut away at the lower front portions thereof to expose the eye members.

14. A rolling eye set comprising a pair of vertically oscillatable outer shells, collars projecting sidewardly at the adjacent sides of the outer shells, a horizontal stub shaft extending between said collars at the axis of oscillation of the outer shells, the parts being frictionally related to normally cause simultaneous oscillation of the outer shells while affording relative adjustment, a pair of eye members within said outer shells, said eye members having back plates secured thereto at points at the opposite extremities of a horizontal diameter, thereby affording vertical adjustment of the eye members relative to the back plates, upright shafts pivoted in and carried by the outer shells and frictionally secured to said back plates, thereby affording sideward adjustment of the eye members, said upright shafts securing the outer shells and eye members together for simultaneous vertical oscillation about the axis of the horizontal stub shaft, and gravity operated means for causing both vertical oscillation of the eye set and horizontal oscillation of the eye members.

15. A rolling eye set comprising a pair of vertically oscillatable outer shells, a horizontal stub shaft interconnecting the same at the axis of oscillation, a pair of eye members within the outer shells, upright shafts made of stiff wire pivoted in and carried by the outer shells and carrying the eye members, said upright shafts being greatly prolonged at their lower ends and the resulting extensions being bent rearwardly below the outer shells, a single weight bar interconnecting the rear ends of the same for causing both vertical oscillation of the eye set and horizontal oscillation of the eye members, said outer shells being cut away at the lower front portions thereof to expose the eye members, the upper front portions of said outer shells acting as eye lids.

16. In combination, a rolling eye set comprising a pair of vertically oscillatable outer shells, a horizontal stub shaft interconnecting the same at the axis of oscillation, a pair of eye members pivoted within the outer shells for movement about upright axles received in and carried by the outer shells, said axles securing the outer shells and eye members together for simultaneous vertical oscillation about the axis of the horizontal stub shaft, arms extending rearwardly and downwardly from the eye members, gravity operated means connected to the arms, said means causing both vertical oscillation of the eye set and horizontal oscillation of the eye members, said outer shells being adapted to bear slidably against the eye openings in a doll's head, and being cut away at the lower front face thereof to expose the eye members, and an eye set supporting bridge comprising means for attaching the same to a doll head, and further comprising means to oscillatably receive the horizontal stub shaft of the eye set between the outer shells.

17. A rolling eye set comprising a pair of outer shells, means interconnecting the same for simultaneous movement about a horizontal axis, a pair of eye members within the outer shells, upright shafts pivoted in the outer shells and carrying the eye members, said eye members being frictionally fixed adjustably on said upright shafts, said upright shafts securing the outer shells and eye members together for simultaneous vertical oscillation about the horizontal axis, said upright shafts being greatly prolonged at their lower ends and the resulting extensions being bent rearwardly below the outer shells, gravity operated means connected to the arms, said means causing both vertical oscillation of the eye set and horizontal oscillation of the eye members, said outer shells being cut away at the lower front face thereof to expose the eye members.

18. A rolling eye set comprising a pair of vertically oscillatable outer shells, a horizontal stub shaft interconnecting the same at the axis of oscillation, said outer shells being frictionally fixed adjustably on the stub shaft, a pair of eye members within the outer shells, upright shafts pivoted in the outer shells and carrying the eye members, said eye members being frictionally fixed adjustably on said shafts, said upright shafts being greatly prolonged at their lower ends and the resulting extensions being bent rearwardly below the outer shells, gravity operated means connected to the arms, said means causing both vertical oscillation of the eye set and horizontal oscillation of the eye members, said outer shells being cut away at the lower front face thereof to expose the eye members, and the upper portion of the outer shells serving as eye lids.

19. A rolling eye set comprising a pair of outer shells, a horizontal stub shaft interconnecting the same, a pair of eye members within the outer shells, upright shafts pivoted in the outer shells and carrying the eye members, said upright shafts being greatly prolonged at their lower ends and the resulting extensions being bent rearwardly below the outer shells, gravity operated means connected to the arms, said means causing both vertical oscillation of the eye set and horizontal oscillation of the eye members, said outer shells being cut away at the lower front face thereof to expose the eye members, the upper portion of the outer shells serving as eye lids, eye lashes secured to said eye lids, and a motion limiting stop member secured to said stub shaft, and an eye set supporting bridge comprising means for attaching the same to a doll head, and further comprising means to oscillatably receive the horizontal stub shaft of the eye set between the outer shells.

20. A rolling eye set comprising a pair of vertically oscillatable outer shells, a horizontal stub shaft interconnecting the same at the axis of oscillation, said outer shells being frictionally fixed adjustably on the stub shaft, a pair of eye members within the outer shells, upright shafts pivoted in the outer shells and carrying the eye members, said eye members being frictionally fixed adjustably on said shafts, said upright shafts being greatly prolonged at the lower ends and the resulting extensions being bent rearwardly and downwardly below the outer shells, gravity operated means connected to the arms, said means causing both vertical oscillation of the eye set and horizontal oscillation of the eye members, said outer shells being cut away at the lower front face thereof to expose the eye members, the upper portion of the outer shells serving as eye lids, eye lashes secured to said eye lids, and a motion limiting stop member secured to said stub shaft, and an eye set supporting bridge comprising means for attaching the same to a doll head, and further comprising means to oscillatably receive the horizontal stub shaft of the eye set between the outer shells.

21. An eye set comprising a pair of eye members, means pivoting the same for side to side movement in a relatively frictionless manner, gravity operated weight means for moving said eye members from side to side, and means automatically operative solely when the eye members are looking in a desired direction for moderately resisting movement of the eye members to either side.

SAMUEL MARCUS.